United States Patent
Trompower et al.

(10) Patent No.: US 6,275,477 B1
(45) Date of Patent: *Aug. 14, 2001

(54) CAMPUS AREA PAGER SYSTEM

(75) Inventors: Michael L. Trompower, Navarre; Marvin L. Sojka, Doylestown, both of OH (US)

(73) Assignee: Telxon Corporation, Holtsville, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/642,776

(22) Filed: May 3, 1996

(51) Int. Cl.[7] ........................................ H04Q 7/00
(52) U.S. Cl. ................ 370/313; 370/329; 455/426; 455/435; 455/31.3; 340/825.44
(58) Field of Search ........................... 370/313, 326, 370/338, 348, 344, 349, 329, 352, 383; 455/435, 422, 31.2, 31.3, 426, 38.1, 517, 524; 340/825.44, 286.01; 379/167, 170

(56) References Cited

U.S. PATENT DOCUMENTS

| | | | |
|---|---|---|---|
| 5,166,973 | * 11/1992 | Hoff | 455/32.1 |
| 5,202,912 | * 4/1993 | Breeden et al. | 455/465 |
| 5,325,419 | * 6/1994 | Connolly et al. | |
| 5,398,022 | 3/1995 | Lipp. | |
| 5,406,643 | * 4/1995 | Burke et al. | |
| 5,416,827 | * 5/1995 | Gaskill | 455/31.2 |
| 5,463,623 | 10/1995 | Grimes et al. | |
| 5,469,494 | * 11/1995 | Ortiz Perez et al. | |
| 5,548,814 | * 8/1996 | Lorang et al. | |
| 5,579,379 | * 11/1996 | D'Amico et al. | |
| 5,594,945 | * 1/1997 | Lewis et al. | 340/825.44 |
| 5,649,289 | * 7/1997 | Wang et al. | 455/433 |
| 5,696,903 | * 12/1997 | Mahany | 340/825.44 |
| 5,742,906 | * 4/1998 | Foladare et al. | 455/461 |
| 5,777,560 | * 7/1998 | Sakai et al. | 340/825.44 |
| 5,812,951 | * 9/1998 | Ganesan et al. | 455/445 |
| 6,101,394 | * 8/2000 | Illidge | 455/466 |

* cited by examiner

Primary Examiner—Seema S. Rao
(74) Attorney, Agent, or Firm—Amin & Turocy, LLP

(57) ABSTRACT

A pager system which enables users to avoid having to pay monthly service charges. The pager system is particularly useful in that it can be coupled easily to an existing local area network (LAN) to provide paging capabilities within a local area (i.e., a campus) such as a building or set of buildings. Thus, businesses, universities, etc., who currently have a LAN or contemplate installing one can couple the pager system to the LAN in order to provide localized paging. Such localized paging is provided without the need to pay monthly service charges to paging service providers. A business, university, etc., incurs primarily only an initial cost to purchase the pager equipment. Therefore, the present system represents a substantial cost savings compared to WAN based paging service providers for those desiring localized paging.

20 Claims, 11 Drawing Sheets

PAGER SERVER LOOK-UP TABLE

| PAGER ID | PAGER ADDRESS, NETWORK ROUTING |
|---|---|
| 11···11 | A11, BASE STATION 1 |
| 22···22 | A22, BASE STATION 2 |
| 33···33 | 33···33, WIDE AREA PROVIDER |
| ⋮ | ⋮ |
| MOBILE TERMINAL X | MTX, BASE STATION 1 |

CAMPUS AREA PAGER SYSTEM

TECHNICAL FIELD

The present invention relates generally, as is indicated, to a campus area pager system. More particularly, the invention relates to a pager system suitable for introducing paging capabilities over new and existing local area networks (LANs).

BACKGROUND OF THE INVENTION

Pager (or paging) systems are known in the art. Subscribers to such systems carry a personal paging unit (hereinafter referred to as a "pager") which includes a radio frequency (RF) receiver for receiving one-way information. For example, a short alpha-numeric message received by the pager can alert the subscriber to call the office, meet a customer, etc. The pager may be programmed to emit a beeping noise or mechanically vibrate to notify the subscriber in the event a message is received. The subscriber can then read the message by pressing one or more buttons on the pager so as to display the message on an alpha-numeric display.

Paging services are typically provided by a paging service provider which has a number of RF transmitting stations for providing paging coverage over a large geographic area. The transmitting stations are interconnected via a wide area network (WAN) which enables subscribers to receive information input, for example, via a telephone network.

There are, however, a number of drawbacks associated with conventional pager systems such as those discussed above. For example, the paging service providers typically charge subscribers a monthly service charge. Thus, in addition to having to purchase the pagers themselves, subscribers are faced with ongoing monthly service charges which quickly add up to a significant amount of money. The aggregate of such ongoing service charges oftentimes exceed the cost of the pagers themselves. Furthermore, even if the subscribers need the paging service only within a small geographic region, e g., within a single building or set of buildings, the same monthly service charges typically apply.

In addition, such pager systems oftentimes do not provide reliable service. For example, the transmitting stations are typically located some distance away from the pagers to which information is to be transmitted. Interference associated with transmitting signals over long distances and through building infrastructures often causes "dead spots" in which pagers cannot receive information. This can result in important page messages being lost or otherwise not received at least until such time as the pager moves to a location which is not within a dead spot and the messages are resent.

In view of the aforementioned drawbacks associated with conventional pager systems, there is a strong need in the art for a system which eliminates the need to subscribe to a paging service provider and pay monthly service charges. Moreover, there is a strong need in the art for a system which does not rely on a WAN based network. In particular, there is a strong need for a pager system which does not suffer from lost or delayed messages due to frequent "dead spots".

SUMMARY OF THE INVENTION

The present invention relates to a pager system which enables users to avoid having to pay monthly service charges. The pager system is particularly useful in that it can be coupled easily to an existing local area network (LAN) to provide paging capabilities within a local area (i.e., a campus) such as a building or set of buildings. Thus, businesses, universities, etc., who currently employ a LAN or contemplate installing one can couple the pager system of the present invention to the LAN in order to provide localized paging. Such localized paging is provided without the need to pay monthly service charges to paging service providers. As a result, the present invention affords a business, university, etc., the benefit of avoiding monthly service charges and only incurring primarily the initial cost of purchasing the pager equipment. Hence, the present invention represents a substantial cost savings compared to WAN based paging service providers for those desiring localized paging.

Moreover, since the pager system can be connected to an existing LAN, it is easy to eliminate potential "dead spots" by connecting one or more transmitting stations to the LAN. LANs are typically designed to extend to all areas of a building or campus, for example. Accordingly, transmitting stations can be easily connected at different points on the LAN to provide complete pager access throughout the local area.

According to the preferred embodiment which is discussed more fully below, the pager system of the present invention includes an automated pager server which is directly coupled to the LAN for receiving information from devices on the LAN intended to be transmitted to a pager. The pager server transmits the information to a transmitting station which is also coupled to the LAN and which is designated for transmitting information via a wireless link to the pager. Information to be transmitted to a pager may originate from working terminals (e.g., personal work stations) connected to the LAN as well as other devices. The pager system also includes a telephone interface for connecting the pager server to a local PBX and local telephone network so that information received via incoming telephone calls can be forwarded to pagers within the system. In addition, the telephone interface couples the pager server to a conventional WAN based paging service provider so that information from outside the LAN can be transferred to the pagers within the pager system. Similarly, page requests from within the pager system can be routed to the paging service provider in the event such service is necessary.

According to one particular aspect of the invention, a campus area pager system is provided, including: a local area network (LAN) having a system backbone; at least one base station coupled to the system backbone, each of the at least one base station including a wireless communication section; and at least one paging device for receiving page information from the system backbone via the wireless communication section.

According to another aspect of the invention, a campus area pager system is provided, including: a local area network having a system of the at least one base station including a wireless communication section; backbone via the wireless communication section, each of the plurality of paging devices having a respective pager identification number; and a pager request information including a page message and one of the pager identification numbers, and for transmitting the page information on the system backbone in order to be received by the at least one base station and transmitted via the wireless communication section to the paging device In accordance with yet another aspect of the invention, a network system is provided, including: a local area network (LAN) having a system backbone and a plurality of devices coupled to the system backbone for performing non-paging related activities via communications on the system backbone; a plurality of base stations coupled to the system backbone, each of the plurality of base stations including a wireless communication section; a plurality of paging devices for receiving communications from the system backbone via the wireless communication section of at least one of the plurality of base stations, each of the plurality of paging devices having a respective pager identification number; and a pager server coupled to the system backbone, the pager server for receiving page request information including a page message and one of the pager identification numbers, and for transmitting the page information on the system backbone in order to be received by the at least one base station and transmitted via the wireless communication section to the paging device corresponding to the one of the pager identification numbers.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
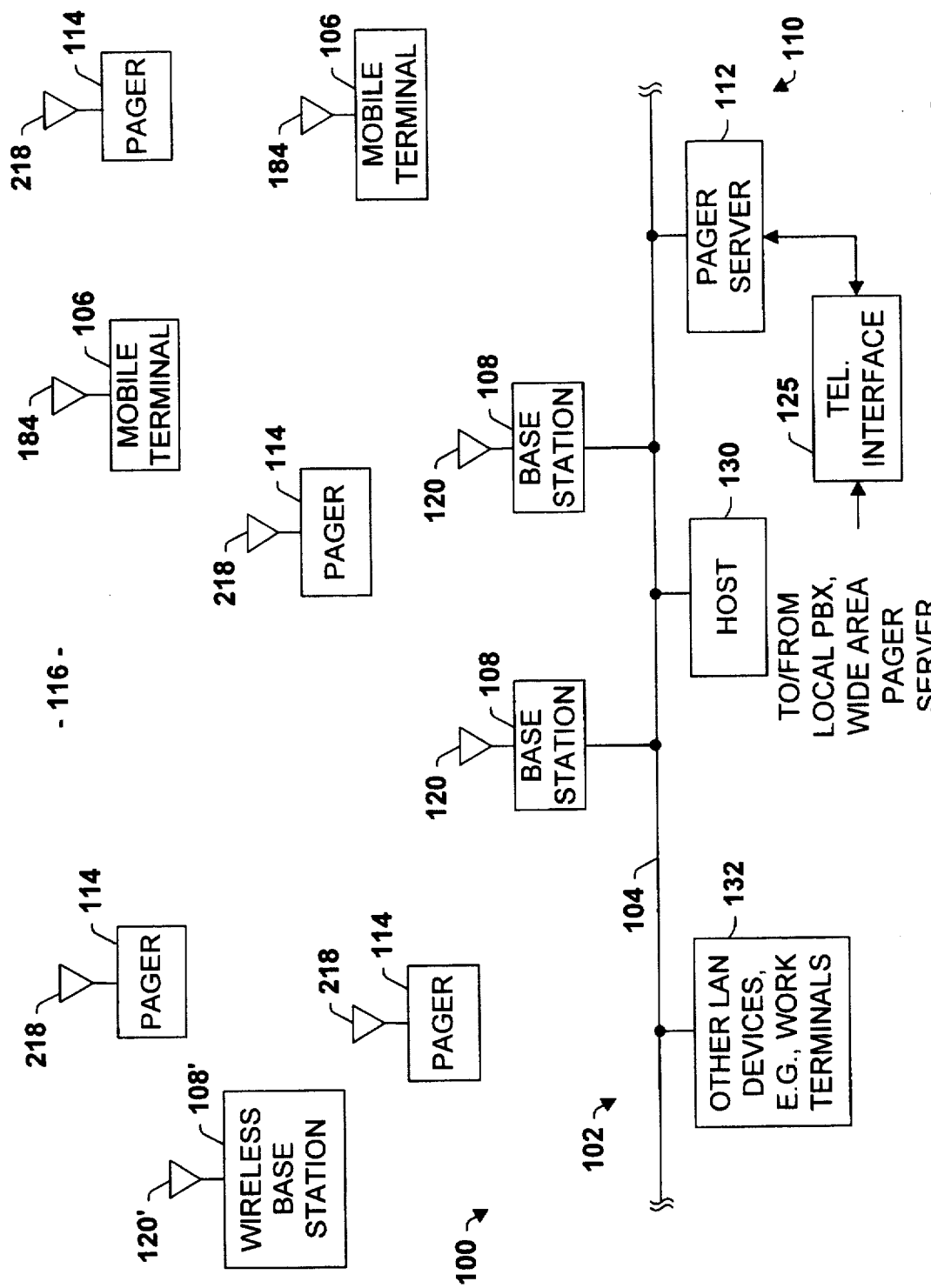
FIG. 1 is a block diagram of a cellular communication system including a campus area pager system in accordance with the present invention.

The campus area pager system of the present invention will now be described with reference to the drawings, wherein like reference numerals are used to refer to like elements throughout.

Referring initially to FIG. 1, the campus area pager system of the present invention is shown incorporated within a cellular communication system generally designated 100. The cellular communication system 100 is centered around a local area network (LAN) 102. The LAN 102 consists in part of one or more base stations 108 connected together via a hardwired data communication path, commonly referred to as a system backbone 104. The cellular communication system 100 may be of the type utilized in retail stores or warehouses, for example. Such systems are useful for tracking inventory and replenishing stock. Employees may enter inventory information using a hand held or portable mobile terminal 106 which can be carried throughout the store or warehouse. The information entered into the mobile terminals is then transferred to the system backbone 104, for example, by way of a base station 108 which is coupled to the system backbone 104. In manufacturing facilities, the cellular communication system 100 can be useful for tracking parts, completed products and defects. In a medical environment, the cellular communication system 100 is useful for reducing the time needed to fill out forms and eliminate inaccuracies by allowing medical personnel to transmit data directly from a mobile terminal 106 carried by the medical personnel. Such data can then be evaluated at a central location on the LAN 102.

Cellular communication systems in which mobile terminals 106 are used to track inventory, medical information, etc., are known in the art, and are commonly used in many different businesses, retail stores, hospitals, etc. The cellular communication system 100 differs from conventional systems, however, in that it also includes a campus area pager system 110 for providing paging services within the cellular communication system 100. Specifically, the pager system 110 includes a pager server 112 directly coupled to the system backbone 104, and a plurality of paging devices 114 ("pagers") for receiving pages. Mobile terminals 106 could also be configured to transmit or receive pager communications as is discussed in more detail below. Each pager 114 is designed to be carried by a respective user as the user moves about a geographic region 116 covered by the communication system 100. Someone wishing to contact a particular user sends a page request to the pager server 112. As is described more fully below, the pager server 112 receives page requests from the LAN 102 or a telephone interface 125 and directs the request to the appropriate pager 114. The base station 108 with which the pager 114 is registered then proceeds to transmit the page message to the pager 114 via an RF transmitter. The actual size of the region 116 depends on the range of the devices in the particular communication system 100, but typically the region 116 will encompass an entire building, a set of buildings, or some other local area.

A feature of the present invention is that the pager system 110 is designed such that it can be connected to virtually any existing or newly created LAN such as the LAN 102 included in the cellular communication system 100. By adding a pager server 112 and pagers 114 or mobile terminals 106 capable of handling pager functions, localized paging service is available at relatively low cost and without needing to pay ongoing monthly service charges associated with WAN based paging service providers. When adding a pager server 112 and pagers 114 to an existing LAN other than a cellular communication system 100, it may be necessary to also add one or more base stations 108 which are connected to the system backbone 104. Again, however, this represents a relatively small up-front cost for equipment and avoids the monthly fees associated with paging services.

Describing now the communication system 100 in more detail, the system backbone 104 may be made up of a twisted pair cable, shielded coaxial cable or fiber optic lines, for example. Connected to the system backbone 104 are one or more of the base stations 108. As is discussed in more detail below in connection with FIG. 5, each base station 108 is capable of transmitting and receiving information wirelessly and exchanging such information with the system backbone 104. Each base station 108 wirelessly communicates with other devices in the system 100 via an omnidirectional antenna 120 which provides for a generally spherical area of coverage within the region 116. For example, a base station 108 may transmit and receive information by way of a radio signal to/from one or more mobile terminals 106 and/or pagers 114 within the system 100 as is described in detail below. In addition, if wireless base stations 108' (with their corresponding antenna 120') are utilized to extend the area of coverage of the base stations 108, as is known, the base stations 108 and 108' wirelessly communicate with each other. Directional yagi type antennas or other types of antennas could also be used in place of the antenna 120 as will be appreciated.

The base station 108 with its corresponding antenna 120 is able to transmit and receive RF communications within a respective geographic cell within the region 116. The base stations 108 are preferably positioned throughout the region 116 on the system backbone 104 such that their combined cell area coverage allows for full wireless communication access with the pagers 114 and mobile terminals 106 throughout the region 116. Thus, for example, users may carry a pager 114 throughout an entire building, set of buildings, etc., and always remain within radio contact of one of the base stations 108 in order to be able to receive a page. Similarly, users having a mobile terminal 106 can transmit and/or receive information from the LAN 102 via a corresponding base station 108.

Figure 12:
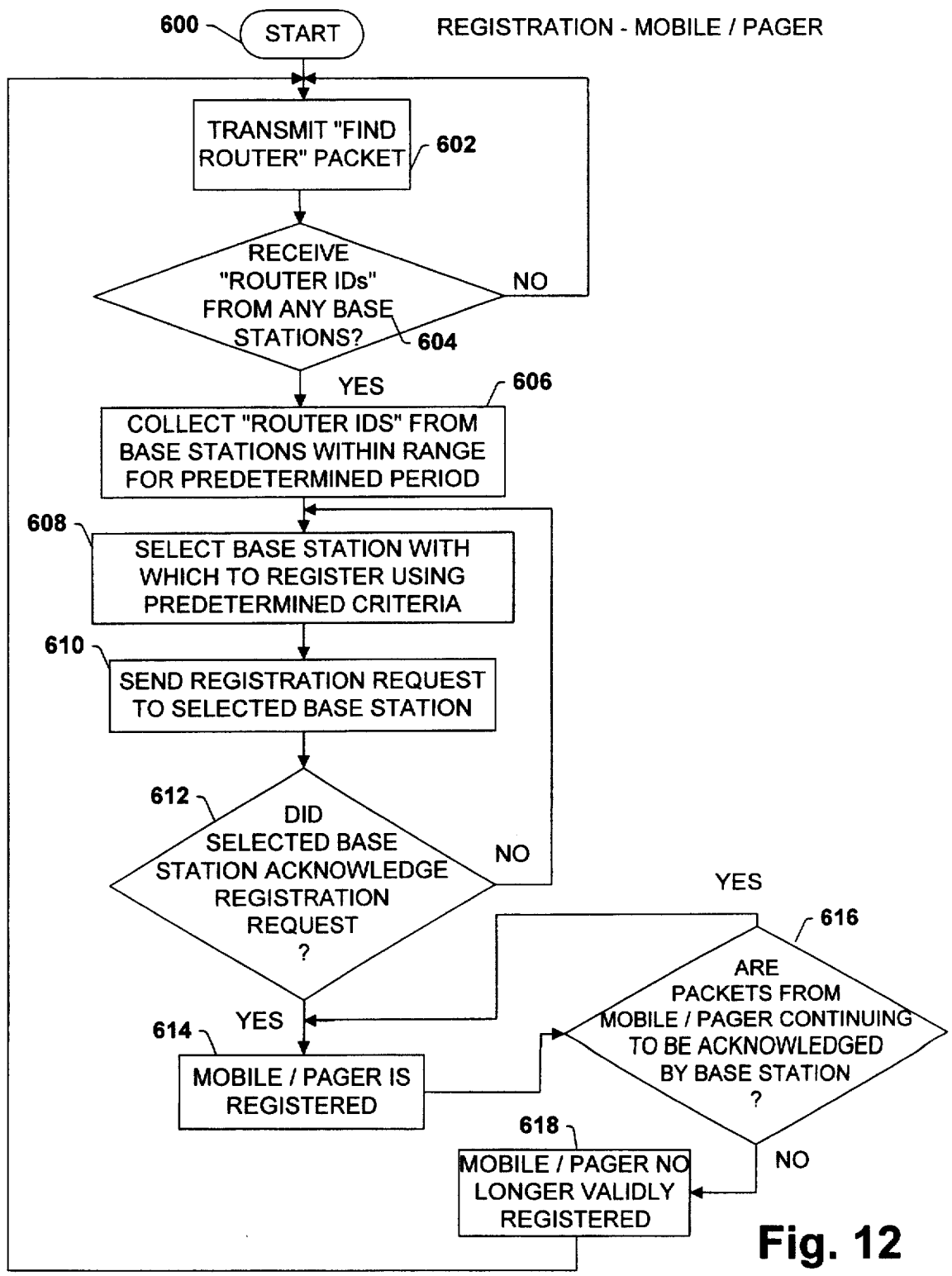
FIG. 12 is a system flowchart suitable for programming the system to carry out a registration procedure among the mobile terminals and pagers with the respective base stations.

As is described below in connection with FIG. 12, the pagers 114 and mobile terminals 106 go through a process of registering and deregistering with base stations 108 as they move about the region 116 from one cell to another. When a pager 114 or mobile terminal 106 is powered up, it "registers" initially with a base station 108. However, as the location of the pager 114 or mobile terminal 106 changes, the pager 114 or mobile terminal 106 may register with a new base station 108, thereby resulting in a deregistration with the previous base station 108. Furthermore, deregistration will sometimes occur if there is no communication between the pager 114 or mobile terminal 106 and its corresponding base station 108 within a predetermined period of time. In any event, movement of the pagers 114 and mobile terminals 106 between cells covered by different base stations 108 is accounted for in order that information can be provided reliably therebetween.

The pager server 112 maintains a look-up table as discussed below which includes a pager identification (ID) number of each pager 114 in the system together with the corresponding network recognizable "identification address" of the pager 114. In the event the LAN 102 utilizes source routing for transmitting information packets, the pager server 112 also keeps track in its look-up table of which pagers 114 are registered to which base stations 108 as described below in relation to FIGS. 10 and 13. Upon receiving a page request, the pager server 112 determines which base station 108 a particular pager is currently registered to. The pager server 112 then routes a page request information packet to the base station 108 which in turn transmits the page to the pager 114. In the event non-source routing is utilized, upon receiving a page request for a particular pager, the pager server 112 simply addresses the page request information packet to the pager 114 based on the identification address in the look-up table. The base station 108 with which the particular pager 114 is registered ultimately receives the page request packet and transmits the packet to the pager 114. Thus, despite which particular cell the pager 114 is currently registered to, the page is transmitted via the appropriate base station 108. The particular manner in which the pager server 112 handles communications relating to the pagers 114 is discussed below with respect to FIGS. 7–11.

With reference still to FIG. 1, the pager system 110 further includes a telephone interface 125 coupled to the pager server 112. The telephone interface 125 interfaces the pager server 112 to a local public telephone network via a local PBX, for example. Such telephone connection can be used to receive page requests from outside the cellular communication system 100. In addition, or in the alternative, access to the local public telephone network allows page requests from within the communication system 100 to be routed outside to a paging service provider as is also discussed below.

A host computer 130 is also connected to the system backbone 104. The host computer 130 serves as the controller for the communication system 100 as is conventional. In addition, the host computer 130 generally serves as a central storage medium for system data, etc., as is also conventional. The LAN 102 includes other devices (generally represented at 132) such as work terminals or stations, printers, facsimile devices, data storage facilities, etc., connected to the system backbone 104. As will be appreciated, the pager system 110 of the present invention has utility with virtually any LAN, and is not necessarily limited to the cellular communication system 100 shown in FIG. 1.

Figure 2:
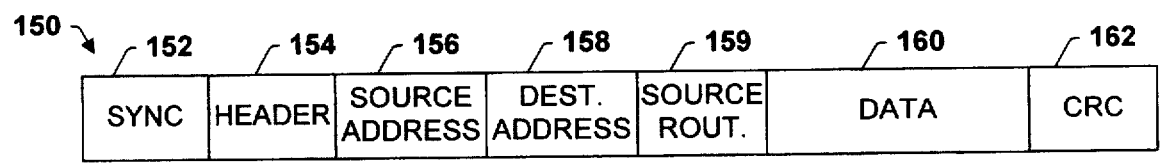
FIG. 2 is a schematic diagram showing an exemplary format of an information packet of the type used for transmitting information within the cellular communication system of FIG. 1 in accordance with the present invention.

Referring now to FIG. 2, information is transmitted between the various devices in the communication system 100 preferably in the form of packets 150. As shown, each packet 150 includes a synchronization field 152 which includes synchronizing bits which allow a device receiving the packet an opportunity to "lock on" to the packet as is conventional. A header field 154 follows the synchronization field 152 and includes information such as the length and type of the packet. For example, the header field 154 may indicate whether the packet is a type which requires a response from the receiving device. A source address field 156 follows the header field 154 and includes the address of the device from which the packet 150 originated. Following the source address field 156, the packet 150 includes a destination address field 158 which holds the address of the device to which the packet 150 is ultimately destined. In the event the LAN 102 utilizes source routing whereby a device transmitting a packet identifies the particular route along the LAN 102 on which the packet is to be transmitted, such information is included in a source routing field 159 included in the packet 150 as is conventional. In a non-source routed LAN 102, the source routing field 159 is omitted as packets are broadcast throughout the entire network absent specified routing. In the preferred embodiment, source routing as conventionally known is employed, but certainly non-source routing could also be used in a conventional manner. A data field 160 in the packet 150 includes various information intended to be communicated to the receiving device. The packet 150 ends with a cyclical redundancy code (CRC) field 162 which serves as an error correcting field according to conventional techniques whereby a receiving device can determine if it has properly received the packet 150.

Figure 3:
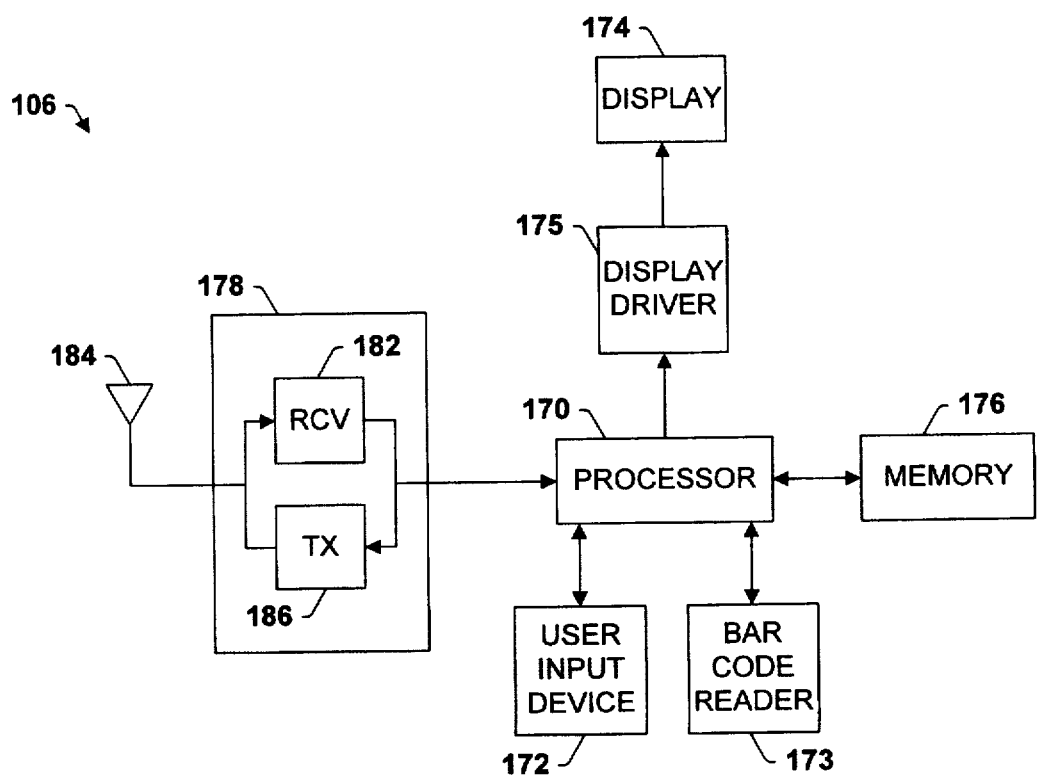
FIG. 3 is a block diagram of a mobile terminal within the cellular communication system of FIG. 1 in accordance with the present invention.

FIG. 3 is a block diagram representing the basic structure of the mobile terminals 106 according to the exemplary embodiment. Each mobile terminal 106 includes a processor 170 which can be programmed to control and to operate the various components within the mobile terminal 106 in order to carry out the various functions described herein. The processor 170 is coupled to an operator input device 172 which allows an operator to input data to be communicated to the LAN 102 such as inventory data, patient information, etc. This information may be sent to the host computer 130 which serves as a central data location, for example, or to a cash register connected to the system backbone 104, as another example, for providing price information. Furthermore, the input device 172 allows an operator to input a page request to be sent to a pager 114 or a mobile terminal 106 serving as a pager via the pager server 112 as discussed in more detail below. The input device 172 can include such items as a keypad, touch sensitive display, etc. The mobile terminal 106 also may include a bar code scanner 173 coupled to the processor 170 for providing another form of data input. A display 174 is also connected to and controlled by the processor 170 via a display driver circuit 175. The display 174 serves as a means for displaying information stored within the mobile terminal 106 and/or received over the system backbone 104 via a base station 108. The display 174 can be a flat panel liquid crystal display with alphanumeric capabilities, for example, or any other type of display as will be appreciated.

A memory 176 is included in each mobile terminal 106 for storing program code executed by the processor 170 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for sake of brevity. The memory 176 also serves as a storage medium for storing information packets 150 received from or intended to be transmitted to a base station 108 as discussed herein.

Each mobile terminal 106 also includes its own RF section 178 connected to the processor 170. The RF section 178 includes an RF receiver 182 which receives RF transmissions from a base station 108 and via an antenna 184 and demodulates the signal to obtain the digital information modulated therein. An example of a suitable RF receiver 182 for use in the mobile terminal 106 (as well as the base stations 108 and pagers 114) is the Model 025 Direct Sequence Spread Spectrum Radio Module, which is commercially available from Aironet Wireless Communications, Inc. of Akron, Ohio.

The RF section 178 also includes an RF transmitter 186. In the event the mobile terminal 106 is to transmit information to the LAN 102 in response to an operator input at input device 172, for example, the processor 170 forms within the memory 176 an information packet 150 (FIG. 2) including data together with a source address (i.e., the address of the particular mobile terminal 106 sending the information) and a destination address (e.g., the host computer 130 or pager server 112). The information packet is then delivered to the RF transmitter 186 which transmits an RF signal with the information packet modulated thereon via the antenna 184 to the base station 108 with which the mobile terminal 106 is registered.

An exemplary mobile terminal 106 which is configured to operate in accordance with the description herein is the commercially available Model PTC-960 portable computer with Model 025 Direct Sequence Spread Spectrum Radio Module. Such unit is available from Aironet Wireless Communications, Inc. mentioned above.

Figure 4A:
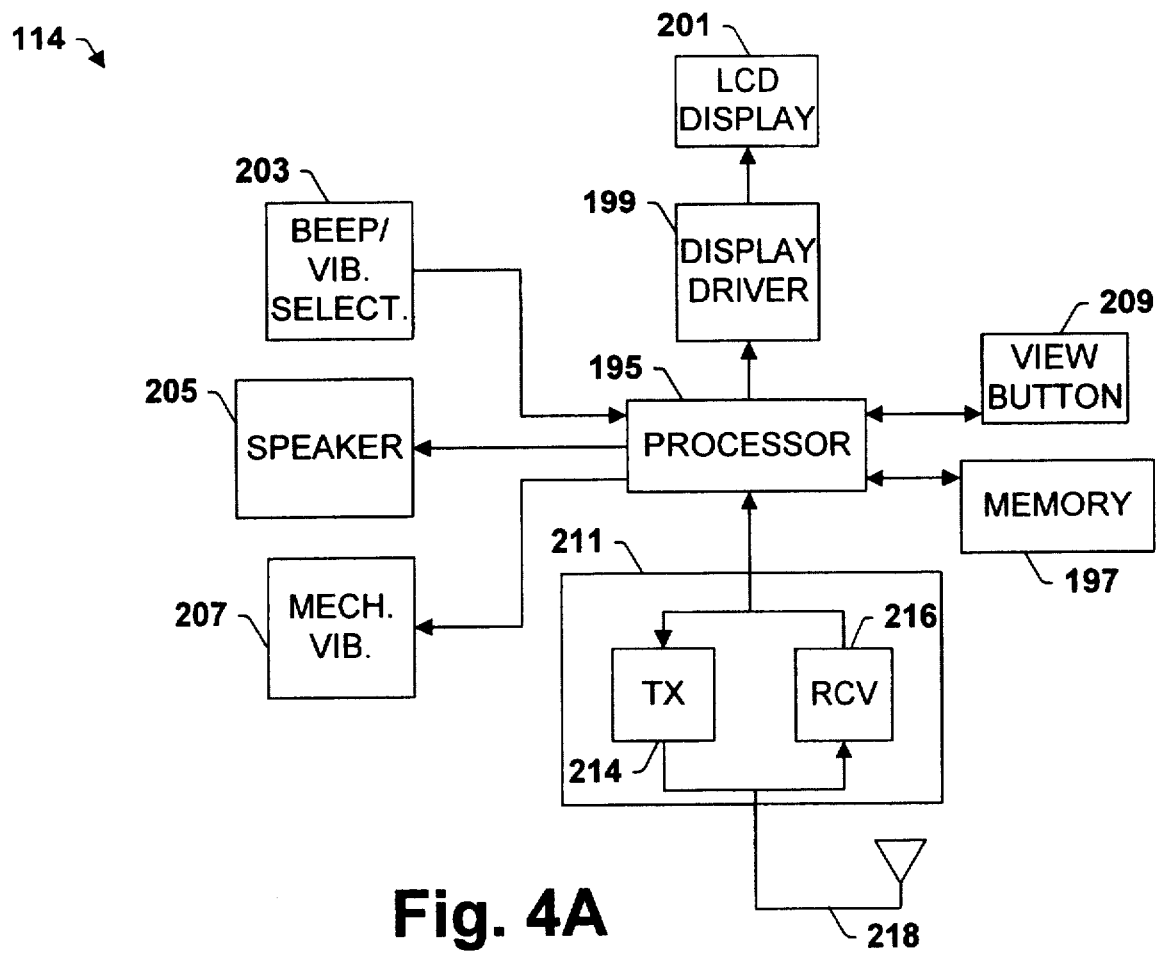
FIG. 4A is a block diagram of a pager in accordance with the present invention.

FIG. 4A represents the configuration of each pager 114 according to the exemplary embodiment. Each pager 114 includes a processor 195 programmed to control the various operations of the pager 114 described herein. The processor 195 is coupled to a memory 197 such as a RAM or combination RAM and ROM which serves in part to store the program code executed by the processor 195 to carry out the various functions described herein. The processor 195, as with all the processors described herein, can be programmed to carry out its respective functions using conventional techniques which will be apparent to those having ordinary skill in the art based on the present specification. As a result, additional detail has been omitted. The memory 197 also serves to store other data such as information received via a page request, for example.

Connected to an output of the processor 195 is a display driver circuit 199 which drives a liquid crystal display (LCD) 201, for example. In the exemplary embodiment, the LCD 201 is capable of displaying up to two lines of alpha-numeric characters with each line having up to 20 characters. Nevertheless, other type displays are certainly within the intended scope of the invention. A beep/vibrate selector switch 203 is connected to an input of the processor 195 which allows a user to set the switch 203 to indicate whether the user is to be notified of a received page by either a beeping sound or a mechanical vibration. Provided the switch 203 is in a beep position, a speaker 205 coupled to an output of the processor 195 is controlled to emit a beeping sound when a page is received as determined by the processor 195. If the switch 203 is in a vibrate position, an electro-mechanical vibrator 207 is activated by the processor 195 when a page is received.

A view button 209 coupled to an input of the processor 195 allows the user to view messages received by the pager 114. For example, the processor 195 is programmed such that if the view button 209 is pressed once by the user, the most recent message which has been received will be displayed by the processor 195 on the LCD 201. If the view button 209 is pressed again within a short time, the user can scroll through a number of recently received messages that have been stored in the memory 197. Furthermore, if the view button 209 is pressed while the speaker 205 or the vibrator 207 is active (indicating a new page has been received), the pressing of the view button 209 will serve to inactivate the beeping or vibration.

The pager 114 also includes an RF section 211 similar to the RF section 178 of the mobile terminals 106 and having an RF transmitter 214 and an RF receiver 216. Signals are received by the RF receiver 216 via an antenna 218. As mentioned above, the communications between the respective devices occur in the form of packets and the RF receiver 216 is designed to demodulate and decode any received signals using conventional techniques in order to obtain the information included therein. The data which is received by the RF receiver 216 is then provided to the processor 195 for further processing in order to be displayed, for example. The packets received by the RF receiver 216 may be page requests sent by a base station 108 as discussed below. Alternatively, for example, the packets may be registration information from one or more of the base stations 108 as discussed below with respect to FIG. 12.

Information to be transmitted by the pager 114 is provided by the processor 195 to the transmitter 214 which in turn encodes and modulates the information onto an RF carrier signal. Such information which is transmitted is limited primarily to registration information which enables the pager 114 to register and deregister with different base stations 108 as the pager 114 roams from one cell location to another. In the preferred embodiment, the pager 114 is dedicated specifically to serving as a device for receiving pages. The pager 114 is not intended to provide the user with any other type of communications and hence can be built using relatively few components.

Figure 4B:
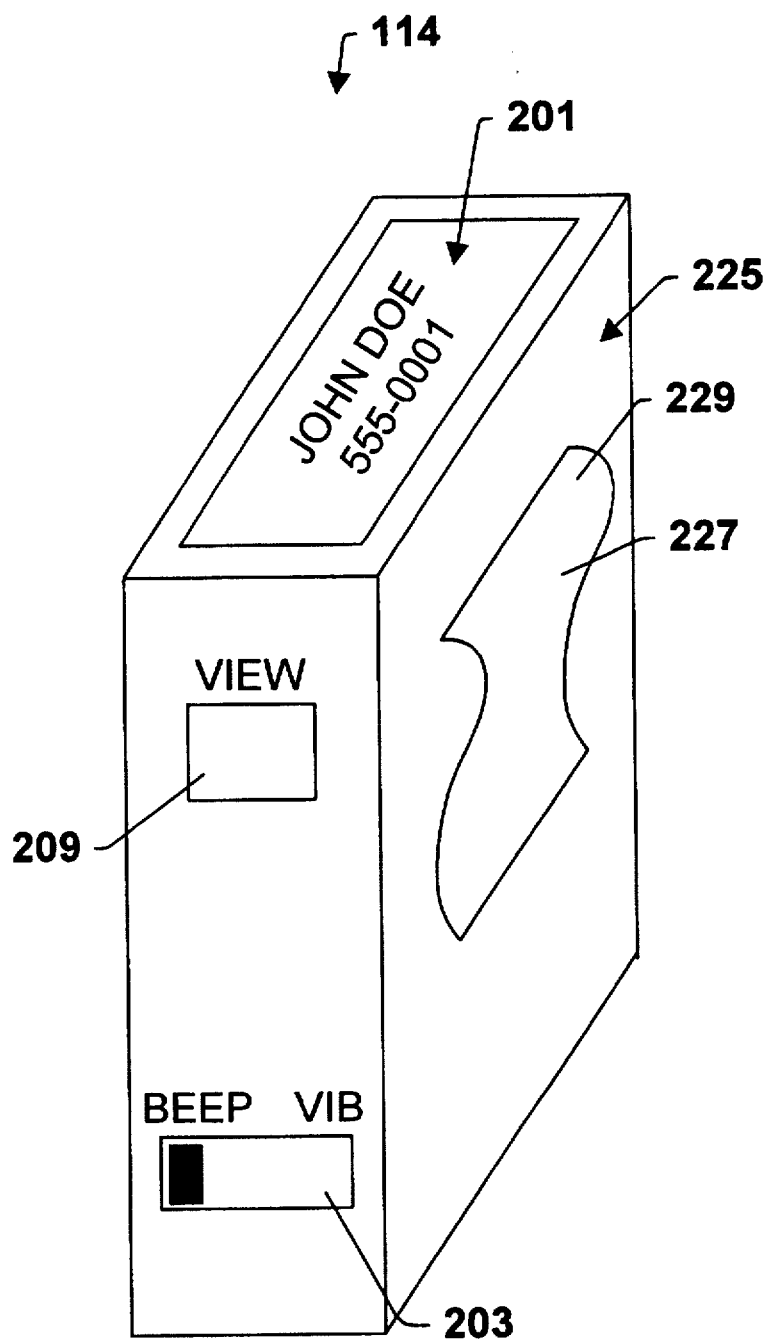
FIG. 4B is a perspective view of the pager represented in FIG. 4A.

FIG. 4B is a perspective view of the pager 114. The pager 114 includes a pocket-sized housing 225 in which the components shown in FIG. 4A are contained. The LCD 201 is exposed at the top portion of the housing 225. The view button 209 and beep/vibrate selector switch 203 are mounted on the side of the housing 225 for easy access. A belt clip 227 is integrally molded at an end 229 to the housing 225, and together with the housing 225 is preferably made of high-strength, lightweight plastic. The belt clip 227 allows the user to clip the pager 114 to his or her belt as will be appreciated.

Figure 5:
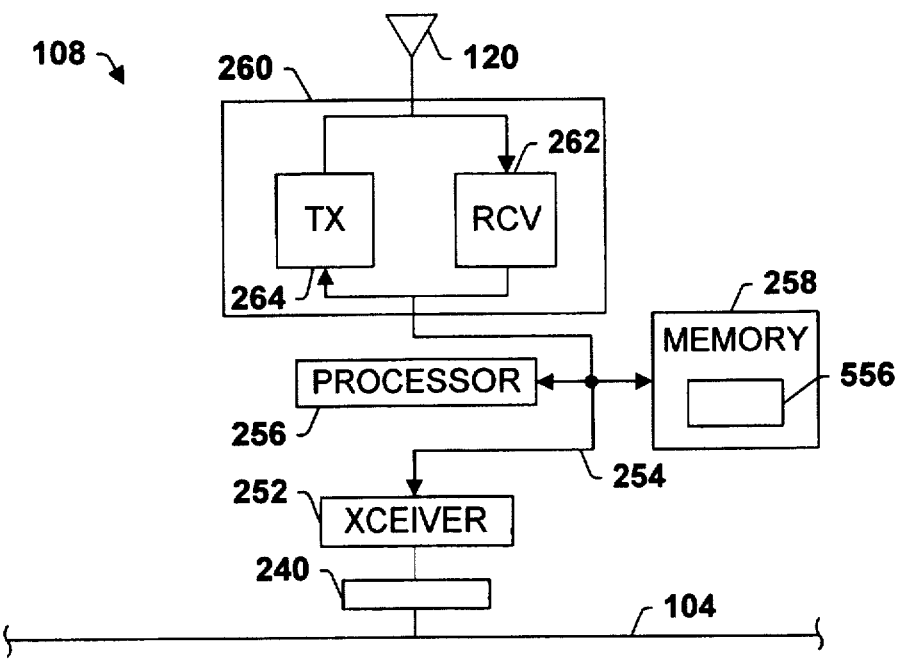
FIG. 5 is a block diagram of a base station in accordance with the present invention.

Referring now to FIG. 5, a block diagram representative of each base station 108 is shown. Each base station 108 is connected to the system backbone 104 via a connector 240 such as a DB-9 or RJ-45 connector. The connector 240 is connected to the system backbone 104 at one end and to a network adapter transceiver 252 included in the base station 108 at the other end. The network adapter transceiver 252 is configured according to conventional network adapter transceiver techniques to allow the base station 108 to communicate over the system backbone 104. The network adapter transceiver 252 is also connected to an internal bus 254 included within the base station 108. The base station 108 further includes a processor 256 connected to the bus 254 for controlling and carrying out the operations of the base station 108. The processor 256 may include any of a variety of different microprocessors, such as the Motorola 68360 (25 MHz) or Intel 80386 microprocessors.

The base station 108 also includes a memory 258 connected to the bus 254. The memory 258 stores program code executed by the processor 256 to control the other elements within the base station 108 to carry out the functions described herein. It will be readily apparent to a person having ordinary skill in the art of computer programming how to program the processor 256 and the other elements within the base station 108 to carry out the operations described herein using conventional programming techniques based on the flowcharts and descriptions provided herein. As a result, additional detail as to the specific program code has been omitted. The memory 258 also serves to buffer packets of information such as those received over the system backbone 104 or those transmitted to or received from the mobile terminals 106 or the pagers 114. Moreover, the memory 258 functions to store information tables maintained by the processor 256 including information such as a list of the mobile terminals 106 and pagers 114 which are currently registered with the base station 108.

Also connected to the bus 254 is an RF section 260 included in the base station 108. The RF section 260 includes the aforementioned antenna 120 for receiving radio signals from and transmitting radio signals to mobile terminals 106 and pagers 114 within the cell area of the base station 108. Information transmitted from a mobile terminal 106 or pager 114 is received via the antenna 120 and is processed by an RF receiver 262 which demodulates and decodes the signal and converts the information to a digital signal having the aforementioned packet format. The processor 256 in the base station 108 inserts source routing information into the source routing field of the packet received from the mobile unit, if needed. Thereafter, the processor 256 stores the packet in the memory 258 until such time as the base station 108 is able to transmit the information packet onto the system backbone 104 via the network adapter transceiver 252 and connector 240.

Information packets which are transmitted to the base station 108 via the system backbone 104 for transmission to a mobile terminal 106 or pager 114 are received by the network transceiver 252. The processor 256 controls an RF transmitter 264 included in the RF section 260, the RF transmitter 264 also being connected to the bus 254. The processor 256 causes the RF transmitter 264 to modulate an RF signal using spread spectrum techniques, for example, which in turn carries the information packet to the appropriate mobile terminal 108 or pager 114. Exemplary hardware for carrying out the above-described basic functions of transmitting and receiving data between the system backbone 104 and one or more mobile terminals 108 or pagers 114 is found in the ARLAN 631® Token Ring Access Point, which is commercially available from Aironet Wireless Communications, Inc., Akron, Ohio.

Figure 6:
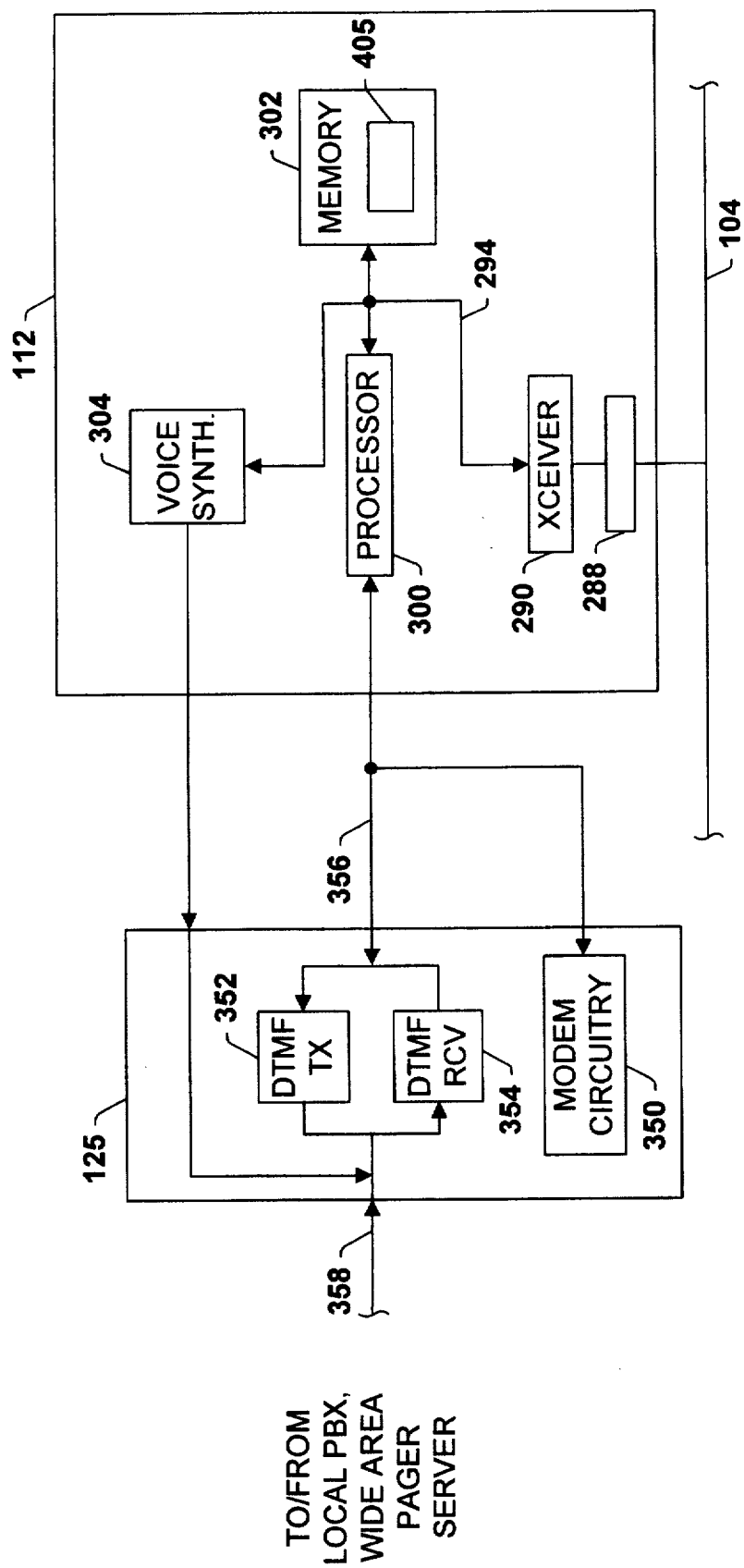
FIG. 6 is a block diagram of a pager server and telephone interface included within the pager system of FIG. 1 in accordance with the present invention.

Turning now to FIG. 6, the hardware configuration of the pager server 112 and telephone interface 125 is shown. Similar to the base station 108 shown in FIG. 5, the pager server 112 is connected directly to the system backbone 104 via a connector 288 such as a DB-9 or RJ-45 connector. The connector 288 is connected to the system backbone 104 at one end and to a network adapter transceiver 290 included in the pager server 112 at the other end. The network adapter transceiver 290 is configured according to conventional network adapter transceiver techniques to allow the pager server 112 to communicate over the system backbone 104. The network adapter transceiver 290 is also connected to an internal bus 294 included within the pager server 112. The pager server 112 further includes a processor 300 connected to the bus 294 for controlling and carrying out the operations of the pager server 112 described herein. The processor 300 may include any of a variety of different microprocessors, such as the Motorola 68360 (25 MHz) or Intel 80386 microprocessors.

The pager server 112 also includes a memory 302 connected to the bus 294. The memory 302 stores program code executed by the processor 300 to control the other elements within the pager server 112 and to otherwise carry out the functions described herein. It will be readily apparent to a person having ordinary skill in the art of computer programming how to program the processor 300 and the other elements within the pager server 112 to carry out the operations described herein using conventional programming techniques based on the flowcharts and descriptions provided herein. As a result, additional detail as to the specific program code has been omitted. The memory 302 also serves as data storage and to buffer packets of information received over the system backbone 104 for processing. As discussed more fully below, these information packets include page requests which are received on the system backbone 104 from another device. The processor 300 processes the packet and forwards a corresponding page request packet to the appropriate pager 114 via the system backbone 104.

Figures 8, 10:
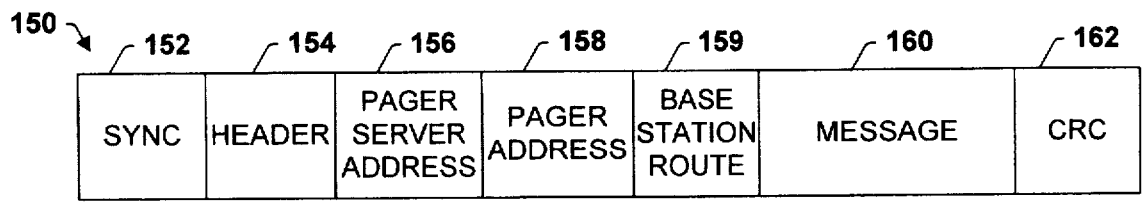
FIG. 8 is a schematic diagram representing the contents of an exemplary page request information packet transmitted by the pager server of FIG. 6 in accordance with the present invention.
FIG. 10 represents the contents of a look-up table included in memory within the pager server for identifying the network recognizable address of valid pagers within the system in order to forward pager information thereto.

Moreover, the memory 302 functions to store an information look-up table as discussed below in relation to FIG. 10. The look-up table is maintained by the processor 300 and includes information relating to the network address of the pagers 114 within the system. As discussed in relation to FIG. 13 below, the contents of the look-up table are updated in order that the information remains current as the pagers 114 roam about the region 116. As is also discussed below, one or more of the mobile terminals 106 may also be designed to operate as a pager. In such case, the look-up table within the memory 302 also includes information as to the address of the mobile terminals 106 operating as pagers.

The pager server 112 also includes a voice synthesizer circuit 304 connected to the bus 294. The voice synthesizer circuit 304 is controlled by the processor 300 to convert a previously digitized voice prompt into an analog audio signal which can be transmitted by the pager server 112 onto a telephone line to prompt a user to input desired information as discussed below.

The telephone interface 125 couples the pager server 112 to and serves as an interface between the pager server 112 and the local public telephone network. Such coupling may occur through a local PBX included at the location in which the LAN 102 is installed, or may be connected directly to a local telephone line as is well known. The telephone interface 125 includes conventional modem circuitry 350 for dialing an outgoing call, picking up an incoming call, dialing appropriate prefixes to access a local telephone line or a long distance carrier via a local telephone line, etc. Included as part of the modem circuitry 350 is a dual tone multiple frequency (DTMF) transmitter 352 and a DTMF receiver 354 as are conventionally known. The modem circuitry 350 including the DTMF transmitter 352 and receiver 354 is coupled to an input/output of the processor 300 of the pager server 112 via a bus 356. Information is transferred bidirectionally between the local telephone line designated 358, the pager server 112 and the telephone interface 125 using conventional modem techniques. Hence, further detail is omitted.

It is possible to access the pager server 112 via the local telephone network by dialing the number of the telephone line 358. The telephone interface 125 will pick up the incoming call and serve as a means for transferring information received via the telephone line 358 to the processor 300 in the pager server 112. Similarly, it is possible for the pager server 112 to dial out onto the local telephone line 358 via the telephone interface 125. For example, the pager server 112 may dial a WAN-based paging service provider in order to communicate a page to a pager known to be outside the region 116 as discussed below.

The output of the voice synthesizer circuit 304 is coupled through the telephone interface 125 directly to the local telephone line 358 as represented in FIG. 6. As a result, the output of the voice synthesizer circuit 304 can be used to communicate voice prompts directly over the telephone line 358.

Although the telephone interface 125 is represented as interfacing the pager server 112 to one local telephone line 358, it will be appreciated that the interface 125 can also be used to interface the pager server 112 to multiple local telephone lines if it is contemplated that many calls may need to be handled at the same time and that multiple lines are appropriate.

In operation, a page requester (e.g., a person or device wishing to initiate a page) can enter a page request into the system 100 using a variety of techniques in order to send a page to one of the pagers 114. For instance, the page requester may telephone the pager server 112 via the telephone line 358 and telephone interface 125. The page requester will then be prompted to enter information such as an identification (ID) number of the particular pager 114 to which a page is to be sent and the information which is to be included in the page. The pager server 112 will in turn generate a page request information packet including the page information and forward the packet to the pager 114 via the base station 108 with which the pager 114 is registered. Alternatively, some automated device such as a personal computer (not shown) may be programmed to telephone the pager server 112 via the telephone interface 125 and automatically transmit via the telephone line 358 pager ID information and page information. Such information may be in the form of an E-mail message generated by the personal computer.

Alternatively, a device associated with the LAN 102 can initiate a page request by transmitting a page request having the pager ID and number and page information to the pager server 112 which in turn prepares a formal page request packet which it routes to the appropriate pager 114. Such devices for initiating a request can include one or more of the mobile terminals 106, one or more work terminals 132 connected to the system backbone 104, the host computer 130, etc. These devices can be programmed to prompt a person wishing to send a page to enter the ID number of the pager 114 they wish to page and the message or other page information they wish to send. Upon receiving such information, the devices are programmed to create an information packet containing such information and transmit the packet to the pager server 112 via the system backbone 104. As is discussed in more detail below, the information packet is configured such that the pager server 112 would recognize the information packet as a page request and direct the page request in the appropriate manner.

It is noted that although the pagers 114 are referred to by a pager ID "number", such "number" need not literally be a number but merely some type of identification code which distinguishes one pager 114 from another pager 114.

In order to integrate paging capabilities onto an existing LAN 102 most efficiently, it is preferred that the pager system 110 maintain the packet format of the existing LAN 102 to the extent possible. Thus, no new control fields are inserted into the packet format in the preferred embodiment. For example, FIG. 2 discussed above may represent the packet format of an existing LAN 102 to which the pager system 110 is added. As is explained in more detail below, rather than insert new control fields the page request information packets are recognized by the respective devices on the system backbone 104 by viewing either the source address field 156 or destination address field 158 in the existing packet format. If a page request is made via the telephone line 358 and interface 125, the pager server 112 creates a page request packet which is placed onto the system backbone 104 wherein the source address field 156 would have the address of the pager server 112. The destination address field 158 is the address (e.g., pager ID number) of the particular pager 114 intended to receive the page. If, on the other hand, the page request is made via a device on the LAN 102 (e.g., a work terminal 132, mobile terminal 106, etc.), initially the device transmits the packet with a destination address 158 of the pager server 112. Upon receiving this packet, the pager server 112 converts the packet into a page request packet identical to the format of the packet produced by the pager server 112 when a request is received via the telephone interface 125. Thus, all page request packets would have as their source address the address of the pager server 112. In another embodiment, it would be possible to set the packet type via a control field in order to allow a mobile terminal 106 to distinguish between conventional messages and page messages.

In the preferred embodiment, each device in the system 100 (e.g., the mobile terminals 106, base stations 108, pagers 114, work terminals 132, etc.) is configured to review the source address field 156 of every packet which is received. If the source address corresponds to the pager server 112, the packet is treated as a page request packet and all data in the data field 160 corresponds to the page message. If the address in the source address field 156 corresponds to any other address, the devices are configured to handle the packet in the conventional manner. Hence, for example, if a mobile terminal 106 is programmed to serve also as a pager, it can receive packets with the pager server 112 as the source address and can be programmed to convert the message included in the data field 160 into an alpha-numeric display which is then displayed on the display 174 (FIG. 3). If the mobile terminal 106 detects that the source address field 156 includes an address other than that of the pager server 112, the packet is processed in the conventional manner for the particular communication system 100. Since the packet format according to the present invention need not be changed from that of an existing LAN 102, the remaining devices on the system backbone 104 handle the packets the same as any other and do not need to be specially reconfigured with respect to packet format to be compatible with the paging capability.

Figure 7:
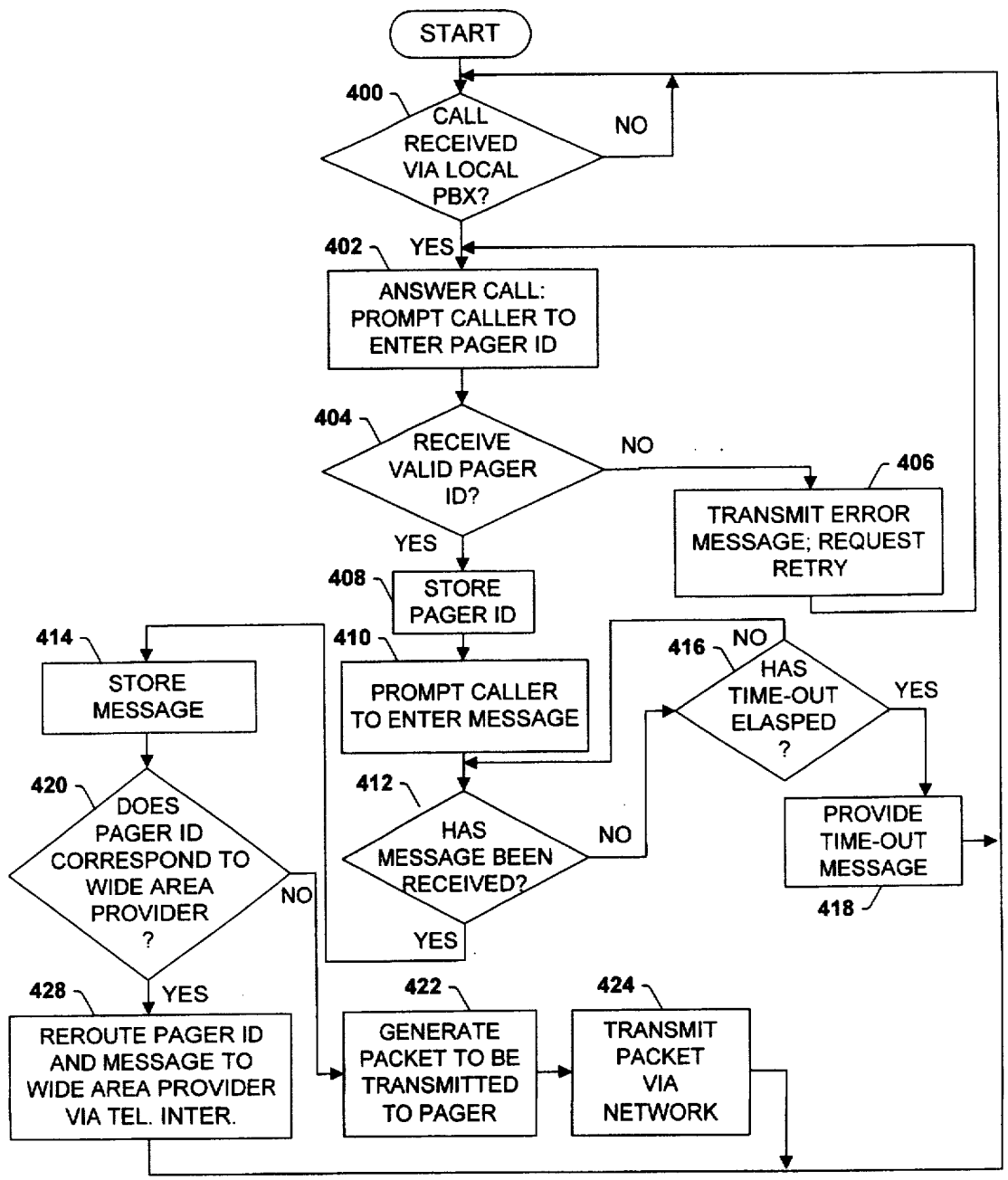
FIG. 7 is a system flowchart suitable for programming the pager system to receive a page request from outside the cellular communication system, and to forward the information included therein to the appropriate pager within the system.

The operation of the pager system 110 of the present invention will now be described by way of illustrative examples. FIG. 7 represents the programmed operation of the pager server 112 with respect to a page request received from a "human" page requester via the telephone interface 125. In step 400, the processor 300 of the pager server 112 determines if a call has been received on the telephone line 358 via the telephone interface 125. Specifically, when a call is received the telephone interface 125 picks up or answers the call and alerts the processor 300 of the incoming call via the bus 356 as shown in FIG. 6. If no call has been received in step 400, the processor 300 continues to loop around step 400.

Upon receiving a call in step 400, the pager server 112 proceeds to step 402 in which the call is responded to by the pager server 112. Specifically, in step 402 the pager server 112 prompts the caller with a voice message to "ENTER PAGER ID NUMBER". Such voice message is digitally stored in the memory 302 and the processor 300 causes the message to be provided to the voice synthesizer circuit 304 where it is converted into an analog audio signal and transmitted onto the telephone line 358. The page requester at the other end of the telephone line 358 then enters the pager ID number of the pager 114 which the page requester wishes to page by inputting a sequence of DTMF tones from a telephone keypad (not shown). These DTMF tones are received by the DTMF receiver 354 of the telephone interface 125 and are converted into corresponding digital information representing the pager ID number using known techniques. Such digital information is then provided by the DTMF receiver 354 to the processor 300. In step 404, the processor 300 receives the pager ID number from the DTMF receiver 354.

The processor 300 then compares the ID number with the pager ID numbers included in a pager server look-up table 405 stored in the memory 302 as mentioned above. As represented in FIG. 10, the pager server lookup table 405 contains a list of all the valid pager ID numbers in the system 110, together with their corresponding network address in a format recognizable on the LAN 102. For example, a pager ID number of "11 . . . 11" which may be input by a page requester in step 404 needs to be converted into an address which is recognizable by the various devices on the system backbone 104, hereinafter referred to as the pager address or pager identification number or address. Note, however, that for mobile terminals 106 also serving as a pager, it will be the case that the pager identification number is the same as the mobile terminal address, and two separate addresses need not be assigned to the same device. In addition, since the present embodiment is based on a LAN 102 which utilizes source routing, the look-up table 405 is maintained by the processor 300 so as to include the corresponding base stations 108 with which the pagers 114 are presently registered. Such information relating to the corresponding base stations 108 includes source routing information for transmitting packets to the base stations 108. Hence, when the pager server 112 transmits a page request packet to a pager 114, the pager server 112 inserts the source routing information for the corresponding base station 108 in the source routing field. In the event the LAN 102 did not utilize source routing, the look-up table 405 need only include the list of valid pager ID numbers and their corresponding addresses recognizable on the LAN 102.

The look-up table 405 also includes the pager ID numbers of pagers 114 which are known to be accessible only via an outside paging service provider (e.g., a conventional WAN based paging service provider). In such case, the look-up table 405 includes both the pager ID number and a flag set to indicate that the particular pager is serviced by a WAN based paging service provider. In the event a page request is received by the pager server 112 which is directed to such a pager, the pager server 112 contacts the WAN based paging service provider via the telephone interface 125 as described below. Furthermore, with respect to any mobile terminals 106 which are intended to receive page messages also, such mobile terminals 106 are also included in the look up table 405 together with their network address and base station information similar to the pagers 114.

Continuing to refer to step 404 in FIG. 7, the processor 300 determines if in fact the pager ID number entered by the page requester (which could also represent a mobile terminal 106 acting as a pager) is included in the look-up table 405 so as to be considered valid. If the pager ID number is not in the look-up table, the processor 300 proceeds to step 406 in which it controls the voice synthesizer circuit 304 to communicate a voice message on the telephone line 358 indicating that an error has occurred and please retry entering the pager ID number. The processor 300 then returns to step 402 and the page requester is again prompted to enter the pager ID number. If such error in step 406 occurs a predetermined number of times in a row, the processor 300 may be programmed to terminate the telephone connection and return to step 400 (not shown in diagram). If the pager ID number entered in step 404 does match an ID number included in the look-up table 405 so as to represent a valid pager ID number, the processor 300 proceeds to step 408 in which the ID number is stored temporarily in the memory 302.

Following step 408, the processor 300 proceeds to step 410 in which the voice synthesizer circuit 304 is used by the processor 300 to transmit a voice prompt on the telephone line 358 to "ENTER PAGE MESSAGES". The pager requester then enters another series of DTMF tones which are received by the DTMF receiver 354 and are converted to digital information that is provided to the processor 300 via the bus 356. The DTMF tones can be encoded and decoded using known techniques to represent alphanumeric information or simply numeric information, for example. Hence, the message may be a telephone number to call or an alphanumeric message such as business information needed by the user. The processor 300 then checks in step 412 whether a message has been received from the page requester via the telephone interface 125. For instance, it may be determined that a message has been received if the processor 300 recognizes that at least one alphanumeric character was entered and a calling party has hung up. If yes, the message is stored temporarily in the memory 302 in step 414. If no, the processor 300 proceeds to step 416 where it determines if a predetermined amount of time has elapsed since the page requester was prompted to enter a message in step 410. If no, the processor 300 returns to step 412. If yes, the processor 300 proceeds to step 418 in which it utilizes the voice synthesizer circuit 304 to communicate a voice message on telephone line 358 that time for entering a message has run out. The processor 300 then instructs the telephone interface 125 to terminate the connection and the pager server 112 returns to step 400.

After the page message has been received and stored in step 414, the processor 300 proceeds to step 420. In step 420 the processor 300 checks whether a flag in the look-up table 405 corresponding to the pager ID number stored in step 408 indicates that the pager is serviced by a WAN based paging service provider. If no, the particular pager 114 (or mobile terminal 106 acting as a pager is known to be) serviced within the system 110 then the processor 300 proceeds to step 422 in which a page request packet is generated as briefly described above. If, for example, the page request is directed to a pager 114 registered to a corresponding base station 108, the processor 300 will generate a page request packet 150 as shown in FIG. 8. The source address field 156 will include the address of the pager server 112. The destination address field 158 will include the network address of the of the particular pager 114 identified by the pager ID number stored in step 408. The network address is obtained based on the contents of the look-up table 405. The source routing field 159 will include the source routing information corresponding to the base station 108 to which the pager 114 is currently registered, such information also being determined from the look-up table 405. The data field 160 will include the message which was stored in step 414.

In the event the pager ID number stored in step 408 is actually a mobile terminal 106 which is also operating as a pager, the source address field 156 again will include the address of the pager server 112. The destination address field 158 will have the address of the mobile terminal 106, and the source routing field 159 will have source routing information corresponding to the base station 108 with which the mobile terminal 106 is currently registered. Again, the destination address and source routing information are obtained from the look-up table 405.

Following the formation of the page request packet in step 422, the processor 300 proceeds to step 424 in which the processor 300 causes the page request packet generated in step 422 to be transmitted onto the system backbone 104 via the transceiver 290. Ultimately, the base station 108 to which the pager 114 identified in the destination address field 158 of the page request packet is registered will receive the packet from the system backbone 104 and transmit the packet to the pager 114 via the RF transceiver as discussed below in connection with FIG. 11. Following step 424, the processor 300 returns to step 400.

If in step 420 it is determined that the pager ID number corresponds to a pager which is known to be serviced only by the WAN based paging service provider, the processor 300 proceeds to step 428 as shown. In step 428, the processor 300 causes the telephone interface 125 to dial a preprogrammed local access number of the WAN based paging service provider. Thereafter, the pager ID number and message stored in steps 408 and 414, respectively, are communicated to the provider via the telephone interface 125. Communications occur via DTMF tones generated by the DTMF transmitter 352 in response to instructions received from the processor 300. The appropriate automated dialing procedures and communication of the pager ID number and the message are performed according to conventional techniques and a predetermined protocol. The WAN based paging service provider will then handle delivering the message to the appropriate pager as is conventional. Following step 428, the processor 300 returns to step 400.

Figure 9:
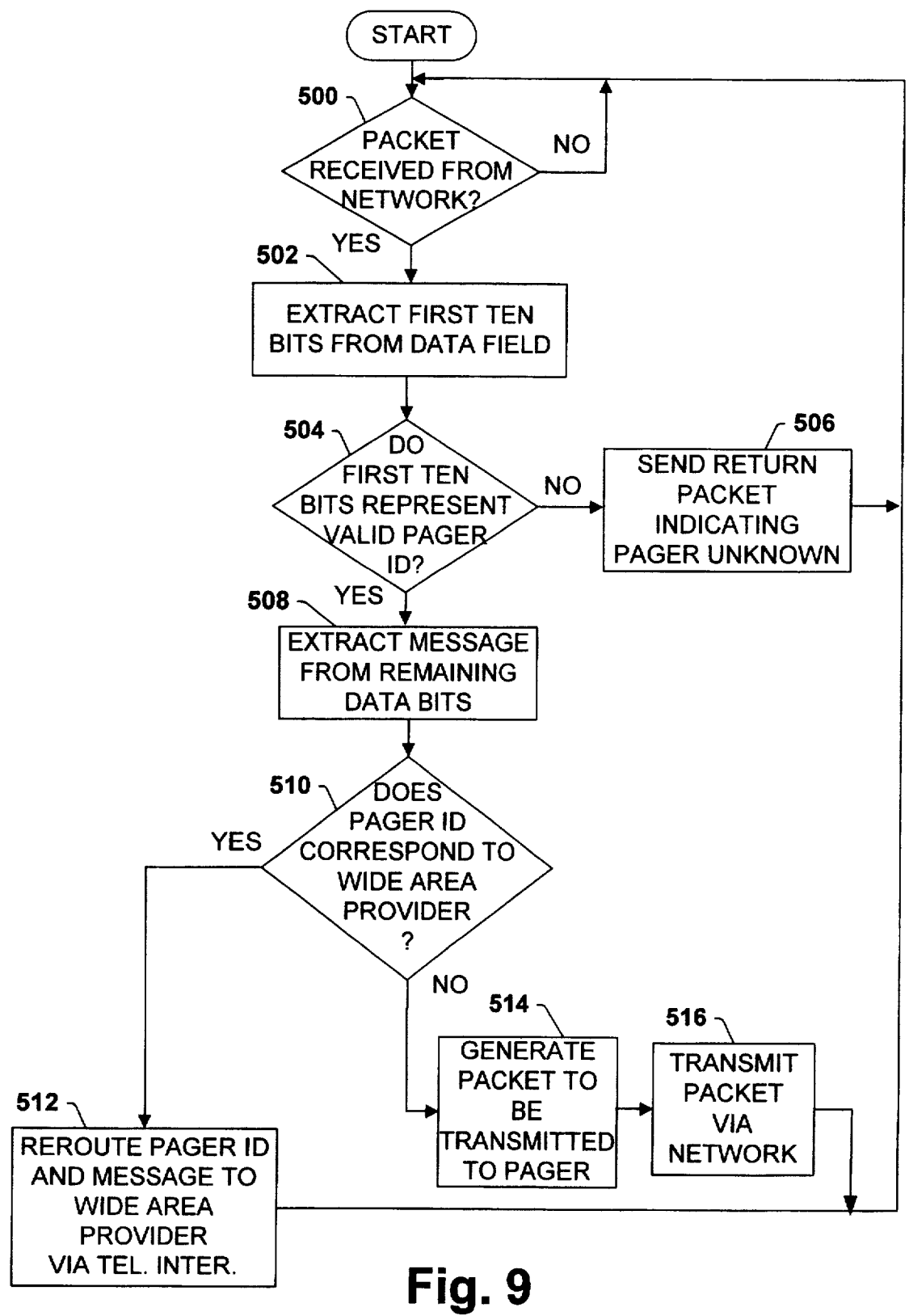
FIG. 9 is a system flowchart suitable for programming the pager system to receive a page request from a device on a local area network within the cellular communication system, and to forward the information included therein to the appropriate pager within the system.

FIG. 9 represents the operation of the pager server 112 in the case where another device on the system backbone 104 issues a page request. In this case, the devices (e.g., work terminals 132, mobile terminals 106, host computer 130, etc.) capable of initiating a page request are configured to generate an information packet 150 for initiating such page request which includes in its destination address field 158 the address of the pager server 112. The first ten bits (or other predetermined number) of the data field 160 include the pager ID number of the pager 114 to which the page request is to be sent. The remainder of the data field 160 is used to include the message which is to be sent to the pager 114. Such message can be an alpha-numeric message alerting the pager user to call home, call the office, etc. The mobile terminals 106, work terminals 132, etc., which are intended to be able to initiate page requests have their respective processors programmed to prompt a user to enter the pager ID number and message information so as to be able to generate the packet. The thus created packets for initiating a page request are then sent to the pager server 112 to be converted to a formal page request packet and sent to the appropriate pager. Page requests initiated by mobile terminals 106 are communicated to the system backbone 104 and the pager server 112 via the base station 108 with which the mobile terminal 106 is registered according to conventional cellular communication techniques. Page requests initiated from work terminals 132 or other devices connected directly to the system backbone 104 are simply transmitted to the pager server 112 directly via the system backbone 104 according to the conventional LAN 102 protocol.

Beginning in step 500 of FIG. 9, the processor 300 of the page server 112 determines if a packet for initiating a page request has been received over the system backbone 104 via the transceiver 290. As mentioned above, the page requests from devices on the system backbone 104 will include the address of the pager server 112 in the destination address field 158 and are henceforth received and recognized by the pager server 112. Until such time as a packet for initiating a page request is received, the processor 300 continues to loop around step 500 as shown. Upon such a packet being received, the processor 300 proceeds to step 502 in which it extracts the first ten data bits from the data field 160, such bits representing the pager ID number as mentioned above. Next, in step 504 the processor 300 determines if the pager ID number represented by the ten data bits represents a valid pager ID number based on the look-up table 405. Such determination is made in the same manner discussed above in relation to step 404 (FIG. 7). If no, the processor 300 proceeds to step 506 in which the processor 300 generates an error message which is included in a return packet transmitted back to the device requesting that the page be initiated. The address of the device requesting the page is known based on the source address of the packet received in step 500. The error message is included the data field 160 and is configured to notify the requesting device that an invalid pager ID number was received. Following step 506, the processor 300 returns to step 500.

If in step 504 it is determined that a valid pager ID number has been received, the processor 300 proceeds to step 508 in which the processor 300 extracts the page message from the remaining bits in the data field 160. Following step 508, the processor 300 proceeds to step 510 which is identical to step 420 described above with respect to FIG. 7. Briefly, the processor 300 determines if the pager ID number corresponds to a pager 114 which is serviced by a WAN based paging service provider or alternatively is serviced within the region 116 by the pager server 112. If the pager ID number represents a pager serviced by a WAN based paging service provider, the processor 300 proceeds to step 512 which is substantially identical to step 428 in FIG. 7, and a page request is transmitted to the WAN based paging service provider via the telephone interface 125. Thereafter, the processor 300 returns to step 500. It is noted that in step 512, however, the message information and pager ID number are those obtained in steps 502 and 508, respectively.

If in step 510 it is determined that the pager 114 identified by the pager ID number obtained in step 502 is not serviced by the WAN based paging service provider, and instead is serviced by the pager server 112, the processor 300 proceeds to steps 514 and 516 in sequence. Steps 514 and 516 are substantially identical to steps 422 and 424 of FIG. 7, respectively. It is noted that in step 514, however, the message information and pager ID number are those obtained in steps 502 and 508, respectively. Otherwise, the operation of generating a page request packet for transmission to the respective pager 114 (or mobile terminal 106 acting as a pager) is identical. Following step 516, the processor 300 returns to step 500.

Accordingly, whether a page request is initiated from outside the LAN 102 (e.g., via the telephone line 358) or a device within the LAN 102, the page server 112 receives the request and generates a page request packet which can be forwarded to a pager 114 or mobile terminal 106 acting as a pager.

Figure 11:
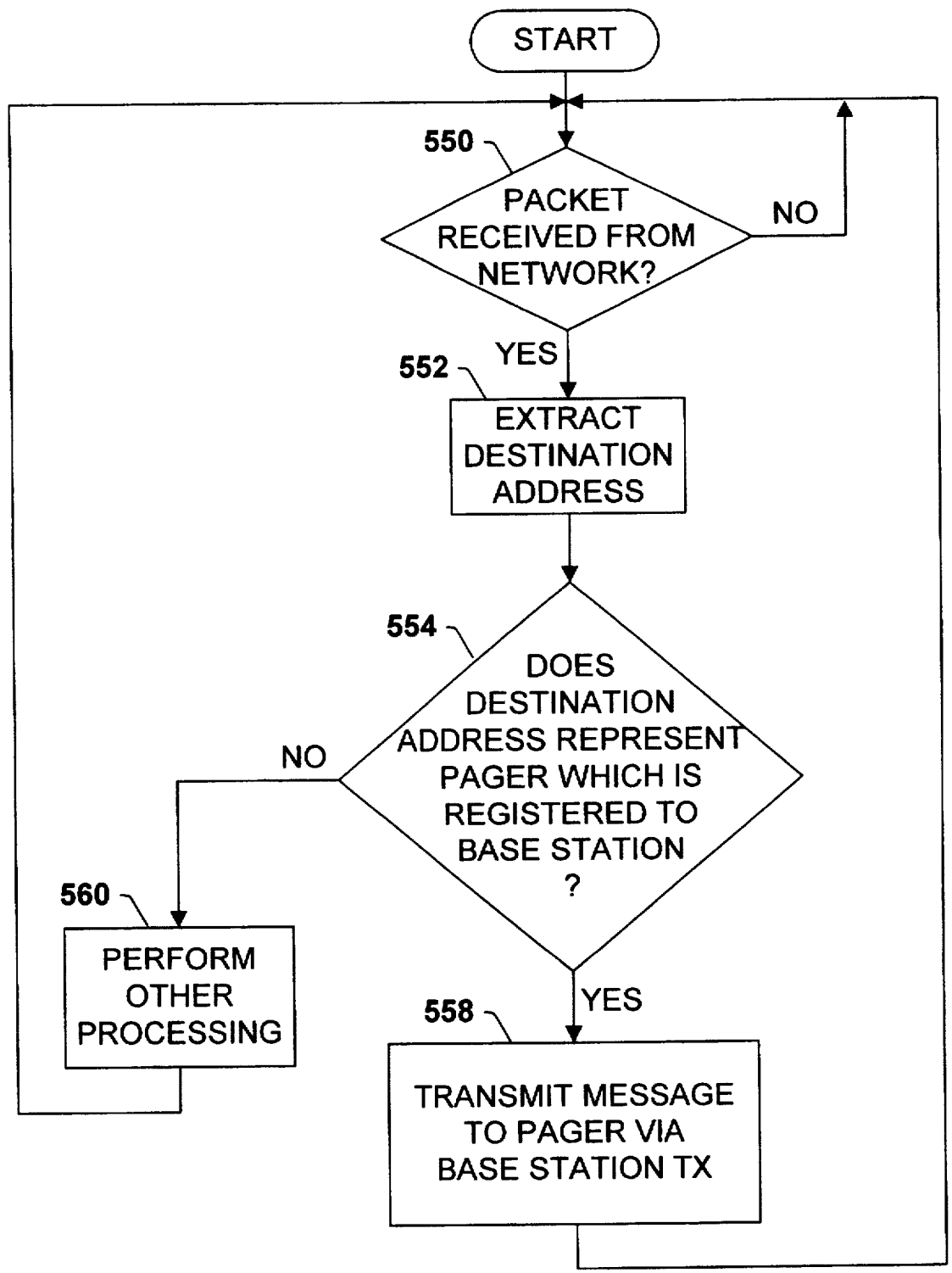
FIG. 11 is a system flowchart suitable for programming a base station within the system to transmit a message to a specified pager in accordance with the present invention.

Referring now to FIG. 11, a flowchart is shown for describing the programmed operation of a given base station 108 for transmitting a page request packet to the appropriate pager 114. In step 550 the processor 256 determines whether any packets 150 have been received from the system backbone 104 via the transceiver 252. If no, the processor 256 continues to loop around step 550. If yes, the processor 256 proceeds to step 552 in which it extracts the destination address from the received packet. As indicated above, the pager server 112 includes in each page request packet the address of the particular pager 114 (or mobile terminal 106 acting as a pager) in the destination address field 158. Thus, following step 552 the processor 256 proceeds to step 554 in which it determines whether the destination address field 158 identifies a pager 114 (or mobile terminal 106 acting as a pager) which is currently registered to the base station 108. As briefly mentioned above, each base station 108 includes a memory 258 (FIG. 4) which includes a look-up table (denoted 556) which is maintained by the processor 256 so as to indicate the currently registered pagers 114 and mobile terminals 106.

If the address in the destination address field 158 corresponds to one of the pagers 114 currently registered to the base station 108 as identified in the look-up table 556, the processor 256 proceeds to step 558. It is in step 558 that the base station 108 transmits the information contained in the page request packet (e.g., the page message) to the pager 114 itself. This is done using convention cellular communication techniques whereby the page request packet is forwarded to the pager 114 via the RF transmitter 264. Specifically, the processor 256 performs any desired preprocessing of the page request packet received via the system backbone 104 and forwards the packet to the RF transmitter 264 which performs any encoding, modulation, etc., prior to transmitting the packet via the antenna 120. Referring briefly to FIG. 4A, the pager 114 which is registered to the base station 108 will receive the packet via the antenna 218 and RF receiver 216. The pager processor 195 evaluates the address in the destination address field 158 and if it matches the address of the pager 114, the processor 195 concludes that the page request is intended for that particular pager 114. The processor 195 extracts the page message from the data field 160 and stores it in memory 197. The processor 195 also activates either the speaker 205 or vibrator 207 as described above to notify the user of the receipt of a page. The user can then recall the page message from the memory 197 using the view button 209 as discussed above.

As noted above, it is possible that the packet received in step 550 is directed to a mobile terminal 106 which also acts as a pager. The fact that the packet is destined for a mobile terminal 106 acting in the capacity of a pager can be easily ascertained by the base station 108 based on the source address information in the source address field 156. Specifically, if the source address field includes the address of the pager server 112, the base station 108 will know that the mobile terminal 106 in such case is acting as a pager. This need not necessarily impact the manner in which the packet is then forwarded by the base station to the mobile terminal 106. However, to the extent it may be desirable for the base station to handle communications to the mobile terminal 106 differently depending on whether the packet is intended for paging or conventional purposes, such information from the source address field is useful.

Referring back to FIG. 11, following step 558 the processor 256 returns to step 550 as shown. If in step 554 it is determined that the destination address of the received packet does not correspond to a pager 114 or mobile terminal 106 acting as a pager, the processor 256 proceeds to step 560. In step 560 the processor 256 processes the received packet as it would under conventional circumstances, such processing being conventional. Thereafter, the processor 256 returns to step 550.

As discussed above, the mobile terminals 106 and pagers 114 are intended to be able to roam about the region 116 from cell to cell. Hence, a registration and deregistration process is carried out. Referring now to FIG. 12, the registration and deregistration process for the mobile terminals 106 and pagers 114 will be explained. It will be appreciated that in this case the process is identical for both mobile terminals 106 and pagers 114. However it is certainly within the scope of the invention to use other and different procedures. With respect to each mobile terminal 106 and pager 114, beginning in step 600 the processor 170/195 of the mobile terminal/pager begins executing a registration routine. Such routine is initiated when the mobile terminal/pager is first powered up, for example. In step 602, the processor 170/195 broadcasts a "find router" packet via the RF transmitter 186/214 to any base stations 108 available to receive the broadcast. The "find router" packet includes information indicating to any base stations 108 which are within receiving range of the broadcast that the particular mobile terminal/pager is seeking to register with a base station. The base stations 108 which receive the packet, in turn, are preprogrammed to transmit a "router identification" packet via the RF transmitter 264 to any mobile terminals/pagers from which they receive a "find router" packet. These "router identification" packets include information as to the identity of the base station 108, the amount of use (or "load") on the base station, and an indication of the relative location of the base station in the LAN 102.

In step 604, the processor 170/195 within the mobile terminal/pager determines whether any "router identification" packets have been received from any base stations 108, via the RF receiver 182/216, within a predetermined period of time. If not, the processor 170/195 returns to step 602 and again transmits a "find router" packet. If the processor 170/195 determines that it did receive one or more "router identification" packets in step 604, the processor 170/195 proceeds to step 606 in which it stores in the memory 176/197 all of the "router identification" packets received during the predetermined time. Next, in step 608, the processor 170/195 is programmed to evaluate the packets according to a predetermined criteria in order to select a base station 108 with which to register. Such predetermined criteria may be based on, for example, which base station 108 exhibits the smallest load. Alternatively, the processor 170/195 may select the base station which is located in a particular relative location in the LAN 102. In another embodiment, the processor 170/195 may select a base station 108 based on a combination of the criteria or based on some other criteria. The particular manner in which the mobile terminal/pager selects a base station 108 with which to register is not critical to the invention as will be appreciated.

In step 610, the processor 170/195 transmits a registration request packet directly to the selected base station 108 via the RF transmitter 186/214. In step 612, the processor 170/195 determines whether an acknowledgment packet is received via the RF receiver 182/216 from the selected base station 108. Each base station 108 is programmed to transmit a registration request acknowledgment packet to a requesting mobile terminal/pager in the event the mobile terminal/pager is registered. If, in step 612, the processor 170/195 determines that the registration request was not acknowledged, the processor 170/195 returns to step 608 and selects another possible base station 108 with which to attempt to register. If there are no other base stations 108 from which a "router identification" has be received, the processor 170/195 is programmed to return to step 602 (not shown). In the event the processor 170/195 does receive a registration request acknowledgment in step 612, the processor 170/195 proceeds to step 614 whereby the mobile terminal/pager now considers itself registered with the selected base station 108.

As the mobile terminal/pager remains registered to a particular base station 108, the mobile terminal/pager will continue to receive transmissions from the base station 108 indicating that the mobile terminal/pager is still within range of the base station. Such transmissions may be in the form of acknowledgments of the receipt of information packets from the mobile terminal/pager. In the event the mobile terminal/pager has been idle and has not transmitted information to the base station 108 for over a predetermined period of time or vice versa, the processor 170/195 is preferably programmed to send out an inquiry requesting that the base station 108 transmit an acknowledgment informing the mobile terminal/pager that it is still within range of the base station 108. As will be expected, the mobile terminal/pager may change location and eventually fall out of range of the base station 108. Alternatively, transmission conditions may change (due to obstructions or the like) such that the mobile terminal/pager is no longer within range of the base station 108.

Therefore, in step 616 the processor 170/195 is programmed to determine whether packets from the mobile terminal/pager are still being acknowledged by the base station 108 with which it is registered. If yes, the processor 170/195 returns to step 614 as shown and the mobile terminal pager remains registered. If no, the processor 170/195 proceeds to step 618 in which it is considered that the mobile terminal/pager is out of range and no longer validly registered with the base station 108. Consequently, the processor 170/195 returns to the beginning of the registration routine and step 602 as shown. Thereafter, the mobile terminal/pager repeats the above-described procedure in an effort to re-register with another base station 108.

As mentioned above, the base stations 108 are programmed to transmit a registration request acknowledgment packet to a requesting mobile terminal/pager in the event the mobile terminal/pager is registered. At the same time, the base stations 108 are programmed to update the contents of their respective look-up tables 556 to reflect the new registrations. In addition, the base stations 108 are programmed to broadcast a new registration packet onto the system backbone 104 indicating to the other devices on the system backbone 104 that a mobile terminal/pager has become newly registered therewith and specifically identifying the particular mobile terminal/pager. This broadcast packet is received by each of the other base stations 108 as well as the pager server 112. This information is used by those devices to update their respective look-up tables 556 and 405. For example, the base station 108 with which the mobile terminal/pager was previously registered would receive the broadcast packet and recognize that the mobile terminal/pager is no longer registered to it. Hence, the base station 108 is programmed to clear the entry from the look-up table 556. In the case of a LAN 102 in which source routing is used, such information relating to where the mobile terminals/pagers are now registered is used to change any source routing information within the base station 108 to the extent appropriate.

Figure 13:
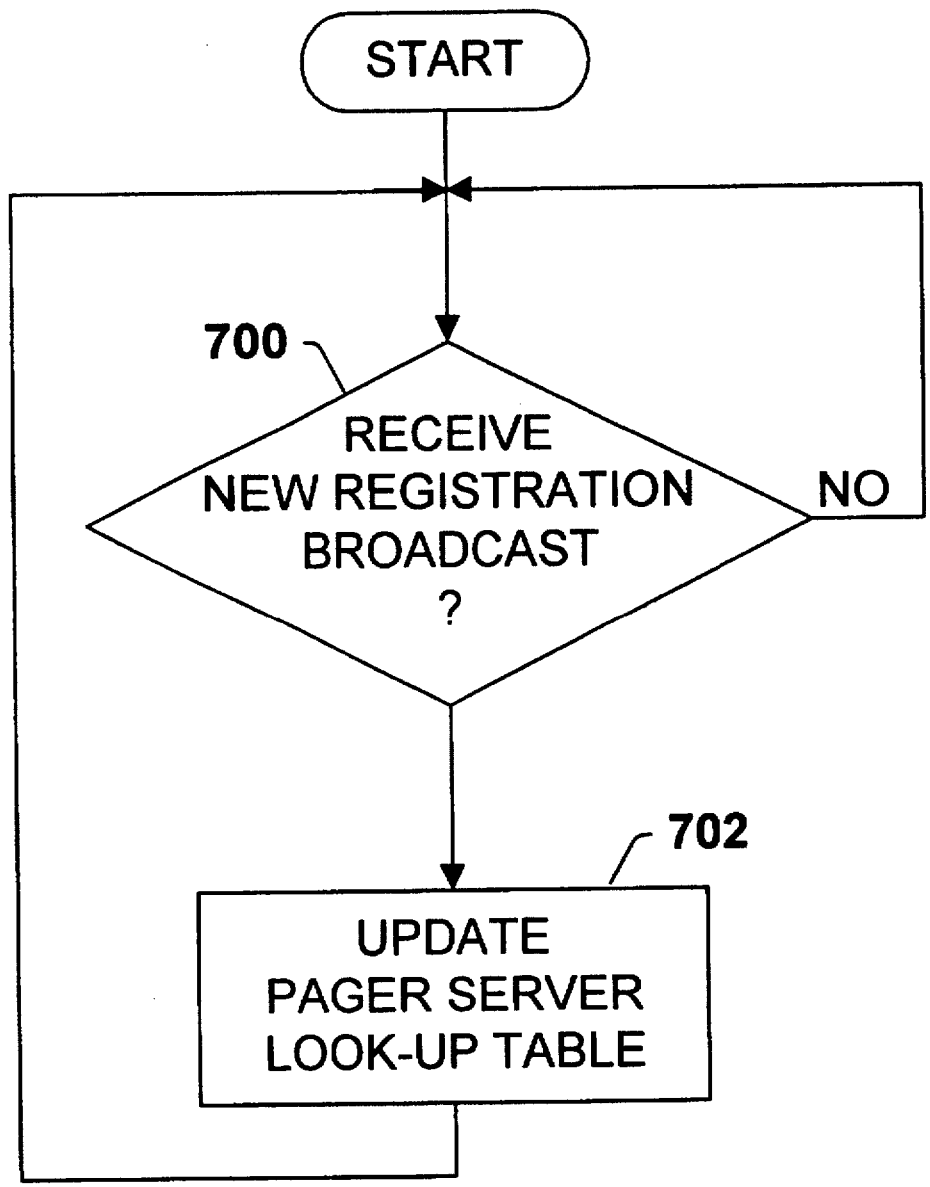
FIG. 13 is a system flowchart suitable for programming the system to carry out a registration update of the pager server look-up table.

FIG. 13 shows the manner in which the pager server 112 receives and processes the new registration packets sent by the base stations 108. Specifically, in step 700 the pager server 112 waits to receive a new registration packet which is broadcast onto the system backbone 104. The pager server 112 continues to loop through step 700 until such packet is received. Upon receiving a packet indicating that a pager 114 or a mobile terminal 106 acting as a pager has newly registered with a base station, the pager server 112 updates the information in its look-up table 405 as represented in step 702. Specifically, the new base station 108 with which the pager 114 or base station 106 is now registered is used to update the previous entry in the look-up table 405. If previously there was not an entry for the particular pager 114 in the look-up table 405, such an entry is created by the pager server 112. Thereafter, the pager server 112 returns to step 700.

Additional detail regarding a registration protocol and possible techniques for updating the look-up tables in accordance with the invention can be found in co-pending U.S. App. Ser. No. 08/539,130 entitled "Network Communication System with Information Rerouting Capabilities". The entire disclosure of application Ser. No. 08/539,130 is incorporated herein by reference. However, it will be appreciated that conventional techniques can also be used.

In another embodiment, each of the mobile terminals 106 and pagers 116 operate in a power savings mode whereby the devices typically reside in a low power sleep mode. Rather than the base stations 108 immediately transmitting packets to the mobile terminals 106 or pagers 114 upon receipt, the packets are stored by the based stations 108. The mobile terminals 106 and pagers 114 are configured to periodically power-up from the sleep mode and poll their corresponding base stations 108 for messages at which time the base station 108 transmits the stored packets to the mobile terminals 106 and pagers 114. An exemplary protocol is described in U.S. Pat. No. 5,276,680. However, such power saving feature is not necessary to the invention as will be appreciated.

In an alternative embodiment, the page message provided by the page requester may be in the form of a voice message which is digitized and included in the data field of the page request packet. It may be the case that a voice transfer program is used to transfer voice messages via the paging system. This may be accomplished by using conventionally known voice encoding and decoding programs to provide half-duplex voice transfer over the system backbone 104. For example, a pager 114 or mobile terminal 106 functioning as a pager may be loaded with a data-to-voice program. Then, if a page message is received with a voice message, the data-to-voice conversion program converts the message into translatable sounds and amplifies and communicates the signal via the speaker 205, for example. Similarly, a page requester may utilize a voice-to-data program and create a short digitized voice message, typically on the order of five seconds, which is converted into standard packet format and wirelessly communicated to the pager server 112 via the LAN 102 as an initial page request. Such voice-to-data conversion can be carried out, for example, by the telephone interface 125 which has circuitry therein to convert the analog voice signal on the telephone line to a digitized signal. The pager server 112 can be programmed to prompt the page requester to enter a voice message by beginning to speak after a beep, for example. In addition, or alternatively, the mobile terminals 106 and/or other devices 132 on the system backbone 104 may include a microphone (not shown) for obtaining an analog voice signal and programmed circuitry (also not shown) for converting the voice signal to a digitized signal which is then included in the data field of the packet initially requesting a page. Voice conversion programs commercially available on the market today and suitable for use in such an embodiment include CELP and Vocoder.

As will be appreciated, the present invention makes it possible to provide paging capabilities over existing or new local area networks. Monthly service charges associated with conventional paging systems are no longer necessary.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A campus area pager system, comprising:

a local area network (LAN) having a system backbone;

at least one base station coupled to the system backbone, each of the at least one base station including a wireless communication section; and at least one paging device for receiving page information from the system backbone via the wireless communication section;

wherein prior to the at least one paging device receiving the page information, the at least one paging device and the at least one base station are configured to establish registration with one another by way of the at least one paging device transmitting a find base station request to file at least one base station and the at least one base station transmitting an identification message to the paging device in response to the find base station request, the paging device selecting to register with one of the at least one base station transmitting the identification message based on a predetermined criteria and sending a registration request to the selected one of the at least one base station and the selected one of the at least one base station transmitting an acknowledgment to the at least one paging device in response to receiving the registration request.

2. The campus area pager system of claim 1, wherein the paging device includes at least one of a speaker for making sound and a vibrator for making mechanical vibration in response to receiving page information from the system backbone.

3. The campus area pager system of claim 1, further comprising a pager server coupled to the system backbone for receiving page information intended to be transmitted to the at least one paging device, and for forwarding the page information on the system backbone in order to be received by the at least one base station and transmitted to the at least one paging device via the wireless communication section.

4. The campus area pager system of claim 3, wherein the page information intended to be transmitted to the at least one paging device is transmitted to the pager server on the system backbone from another device coupled to the system.

5. The campus area pager system of claim 4, further comprising a telephone interface coupled to the pager server for allowing the page information to be transmitted to the at least one paging device to be received by the pager server from a local PBX and a local telephone network and thereafter placed onto the system backbone.

6. The campus area pager system of claim 1, wherein the system includes a plurality of base stations and a plurality of paging devices.

7. The campus area pager system of claim 6, further comprising a pager server coupled to the system backbone for receiving page information intended to be transmitted to one of order to be received by at least one of the plurality of base stations and transmitted to the one of the plurality of paging devices via the wireless communication section.

8. The campus area pager system of claim 7, wherein the at least one of the base stations is a base station with which the one of the plurality of paging devices is registered for service.

9. The campus area pager system of claim 7, wherein the pager server maintains a list of valid pager identification numbers for the plurality of paging devices and corresponding LAN addresses for the plurality of paging devices.

10. A cellular communication system comprising the campus area pager system of claim 6, and further comprising a plurality of mobile terminals located at different locations throughout the campus area for wirelessly communicating with the system backbone via the base stations.

11. The cellular communication system of claim 10, further comprising a pager server coupled to the system backbone for receiving information intended to be transmitted to one of the plurality of paging devices, and for forwarding the information on the system backbone in order to be received by at least one of the plurality of base stations and transmitted to the one of the plurality of paging devices via the wireless communication section.

12. The cellular communication system of claim 10, wherein at least one of the mobile terminals is adapted to both transmit and receive page communications.

13. A campus area pager system, comprising:
a local area network having a system backbone;
at least one base station coupled to the system backbone, each of the at least one base station including a wireless communication section;
a plurality of paging devices for receiving communications from the system backbone via the wireless communication section, each of the plurality of paging devices having a respective pager identification number; and
a pager server coupled to the system backbone, the pager server for receiving page request information including a page message and one of the pager identification numbers, and for transmitting the page information on the system backbone in order to be received by and transmitted via the wireless communication section to the paging device corresponding to the one of the pager identification numbers;
wherein prior to the at least one paging device receiving the page information, the at least one paging device and the at least one base station are configured to establish registration with one another by way of the at least one paging device transmitting a find base station request to the at least one base station and the at least one base station transmitting an identification message to the paging device in response to the find base station request, the paging device selecting to register with one of the at least one base station transmitting the identification message based on a predetermined criteria and sending a registration request to the selected one of the at least one base station and the selected one of the at least one base station transmitting an acknowledgment to the at least one paging device in response to receiving the registration request, the at least one base station broadcasting a new registration packet onto the system backbone to notify any other base station that the at least one paging device has previously registered, that the at least one paging device is now registered with the at least one base station.

14. The campus area pager system of claim 13, wherein the system comprises a plurality of base stations.

15. The campus area pager system of claim 14, wherein each paging device is registered for service to only one of the plurality of base stations at a time, and each of the plurality of base stations maintains a list of which of the plurality of paging devices is currently registered to the base station.

16. The campus area pager system of claim 15, wherein the base station to which the paging device corresponding to the one of the pager identification numbers is registered transmits the page information thereto.

17. The campus area pager system of claim 14, further comprising a plurality of mobile terminals which communicate wirelessly with the plurality of base stations, and wherein at least one of the mobile terminals wirelessly transmits the page request information which is received by the parer server to the system backbone via one of the plurality of base stations.

18. The campus area pager system of claim 13, further comprising a telephone interface for interfacing the pager server to a local telephone network, and wherein the pager server functions to receive page request information including a page message and a pager identification numbers of a paging device known to be serviced by a wide area network paging service provider, and to transmit the page information to the wide area network paging service provider via the telephone interface.

19. A network system, comprising:
a local area network (LAN) having a system backbone and a plurality of devices coupled to the system backbone for performing non-paging related activities via communications on the system backbone;
a plurality of base stations coupled to the system backbone, each of the plurality of base stations including a wireless communication section;
a plurality of paging devices for receiving communications from the system backbone via the wireless communication section of at least one of the plurality of base stations, each of the plurality of paging devices having a respective pager identification number; and
a pager server coupled to the system backbone, the pager server for receiving page request information including a page message and one of the pager identification numbers, and for transmitting the page information on the system backbone in order to be received by the at least one base station and transmitted via the wireless communication section to the paging device corresponding to the one of the pager identification numbers;
wherein prior to the paging device receiving the page information, the paging device and the at least one base station are configured to establish registration with one another by way of the paging device transmitting a find router request to the plurality of base stations and the at least one of the plurality of base stations transmitting an identification message to the paging device in response to the find router requests, the paging device choosing to register with one of the plurality of base stations transmitting the identification message based on a predetermined criteria and sending a registration request to the chosen one of the plurality of base stations and the chosen one of the plurality of base stations transmitting an acknowledgment to the paging device in response to receiving the registration request.

20. The network system of claim 19, wherein the communications relating to non-paging related activities are conducted based on a predefined information packet format, and communications involving the pager server are conducted based on the same predefined information packet format.

* * * * *

UNITED STATES PATENT AND TRADEMARK OFFICE
CERTIFICATE OF CORRECTION

PATENT NO. : 6,275,477 B1
DATED : August 14, 2001
INVENTOR(S) : Michael L. Trompower et al.

It is certified that error appears in the above-identified patent and that said Letters Patent is hereby corrected as shown below:

<u>Claim 1</u>,
Line 30, please replace "file" with -- the --.

<u>Claim 17</u>,
Line 14, please replace "parer" with -- pager --.

Signed and Sealed this

Ninth Day of April, 2002

Attest:

Attesting Officer

JAMES E. ROGAN
*Director of the United States Patent and Trademark Office*